(12) United States Patent
Henry et al.

(10) Patent No.: US 11,949,150 B1
(45) Date of Patent: Apr. 2, 2024

(54) TETHERED UNMANNED AIRCRAFT ANTENNA

(71) Applicant: HRL Laboratories, LLC, Malibu, CA (US)

(72) Inventors: Christopher P. Henry, Malibu, CA (US); Walter S. Wall, Malibu, CA (US); Carson White, Malibu, CA (US); Richard Berg, Driggs, ID (US)

(73) Assignee: HRL LABORATORIES, LLC, Malibu, CA (US)

( * ) Notice: Subject to any disclaimer, the term of this patent is extended or adjusted under 35 U.S.C. 154(b) by 211 days.

(21) Appl. No.: 17/326,266

(22) Filed: May 20, 2021

Related U.S. Application Data

(60) Provisional application No. 63/029,352, filed on May 22, 2020.

(51) Int. Cl.
| | |
|---|---|
| *H01Q 1/28* | (2006.01) |
| *B64C 39/02* | (2023.01) |
| *B64F 3/02* | (2006.01) |
| *B64U 10/13* | (2023.01) |
| *B64U 50/19* | (2023.01) |
| *B64U 50/34* | (2023.01) |
| *H01Q 1/46* | (2006.01) |

(52) U.S. Cl.
CPC ............. *H01Q 1/28* (2013.01); *B64C 39/022* (2013.01); *B64C 39/024* (2013.01); *B64F 3/02* (2013.01); *H01Q 1/46* (2013.01); *B64U 10/13* (2023.01); *B64U 50/19* (2023.01); *B64U 50/34* (2023.01)

(58) Field of Classification Search
CPC ... H01Q 1/28; H01Q 1/30; H01Q 1/46; B64C 39/022; H01T 19/02
See application file for complete search history.

(56) References Cited

U.S. PATENT DOCUMENTS

| | | |
|---|---|---|
| 3,560,982 A | 2/1971 | Fenwick |
| 4,335,469 A | 6/1982 | Tharp |
| 4,476,576 A | 10/1984 | Wheeler |
| 4,633,263 A * | 12/1986 | Altshuler ................. H01Q 1/36 343/706 |
| 4,771,292 A * | 9/1988 | Beach ...................... H01Q 1/50 343/885 |

(Continued)

FOREIGN PATENT DOCUMENTS

WO    WO-2018130888 A1 *   7/2018   ........... B64C 39/022

OTHER PUBLICATIONS

U.S. Appl. No. 16/870,784, filed May 8, 2020, Wall.

(Continued)

*Primary Examiner* — Ab Salam Alkassim, Jr.
*Assistant Examiner* — Leah Rosenberg
(74) *Attorney, Agent, or Firm* — Ladas & Parry, LLP

(57) ABSTRACT

Tethered Unmanned Aircraft Antenna utilizing a Vertical Take Off and Landing (VTOL) Unmanned Aerial System (UAS) which may be provided by quadcopter drone (for example) constrained by a tether connected at one end to a maritime or land-based platform, the tether also being used as a RF antenna. The tether is capable of transmitting DC power to the UAS or drone at a desired antenna height and simultaneously supports RF transmission power with the help of a DC power isolation circuit. The tether is desirously lightweight and corona resistant.

13 Claims, 10 Drawing Sheets

(56) References Cited

U.S. PATENT DOCUMENTS

| | | | |
|---|---|---|---|
| 4,903,036 A | 2/1990 | Wheeler | |
| 7,154,430 B1* | 12/2006 | Buehler | H01Q 1/30 |
| | | | 342/13 |
| 9,233,733 B2 | 1/2016 | Bein | |
| 9,527,608 B1 | 12/2016 | Sotnikov | |
| 9,886,864 B1* | 2/2018 | Chubb | B64C 39/022 |
| 10,435,152 B1* | 10/2019 | Cook | B64C 39/022 |
| 2007/0200027 A1* | 8/2007 | Johnson | B64C 39/022 |
| | | | 244/3.1 |
| 2010/0144293 A1* | 6/2010 | Yoshino | H01Q 21/30 |
| | | | 455/150.1 |
| 2010/0238088 A1* | 9/2010 | Mukai | H01Q 9/16 |
| | | | 343/859 |
| 2010/0248671 A1* | 9/2010 | Yoshino | H04B 7/084 |
| | | | 455/343.1 |
| 2014/0183300 A1* | 7/2014 | MacCulloch | B64C 39/024 |
| | | | 244/1 TD |
| 2019/0061938 A1* | 2/2019 | McCorkle | H01Q 1/22 |
| 2019/0135449 A1* | 5/2019 | Peres | B64D 45/02 |
| 2019/0248484 A1* | 8/2019 | Stough | B64C 39/022 |
| 2022/0413113 A1* | 12/2022 | Fluhler | G01S 7/03 |

OTHER PUBLICATIONS

U.S. Appl. No. 16/868,443, filed May 6, 2020, White.

King, R., et al., "The synthesis of surface reactance using an artificial dielectric", IEEE Transactions on Antennas and Propagation, vol. 31, No. 3, May 1983, pp. 471-476.

Linvill, J.G., "Transistor Negative-Impedance Converters," in Proceedings of the IRE, vol. 41, No. 6, pp. 725-729, Jun. 1953.

Silveirinha, M., "Electromagnetic characterization of textured surfaces formed by metallic pins", IEEE Transactions on Antennas and Propagation, vol. 56, No. 2, Feb. 2008, pp. 405-415.

Watt, A.D. "VLF Radio Engineering," Pergamon Press, 1967, sections 2.1 and 2.9, pp. 15-25, pp. 164-168, (22 pages).

* cited by examiner

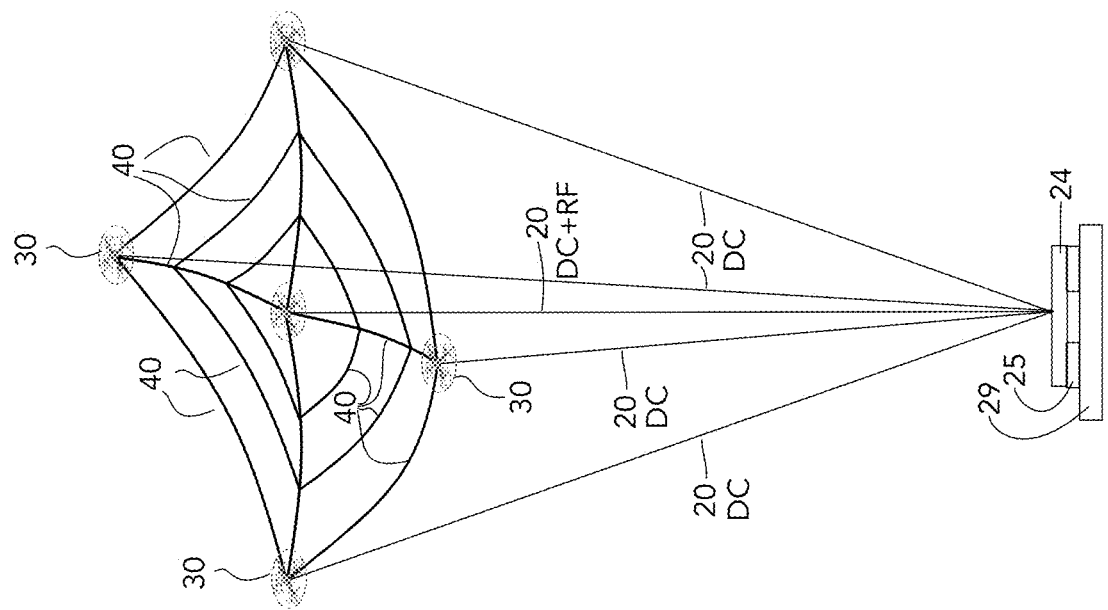
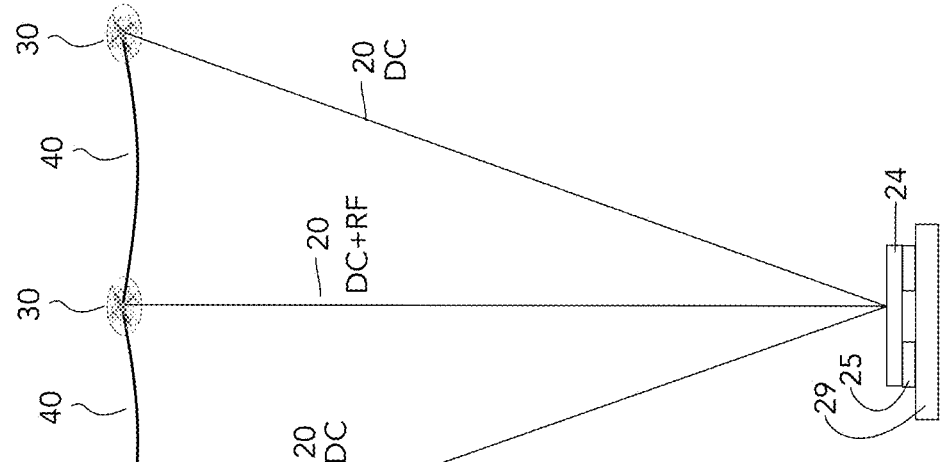
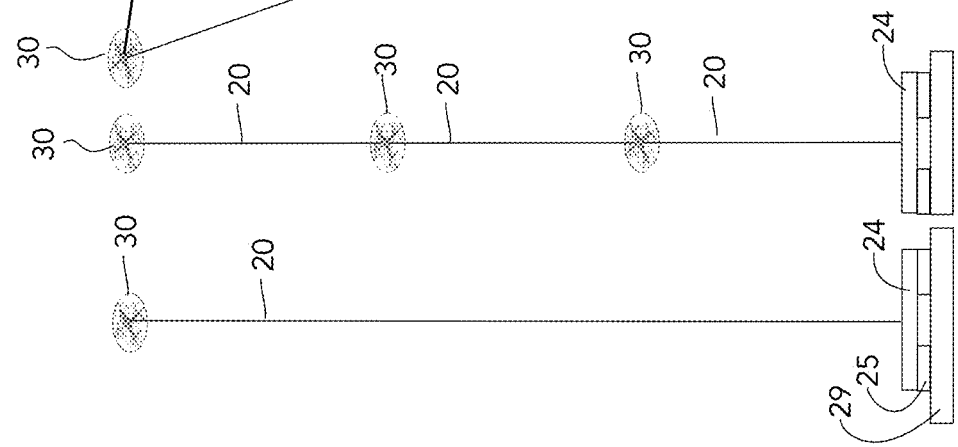
Figure 2a  Figure 2b  Figure 2c  Figure 2d

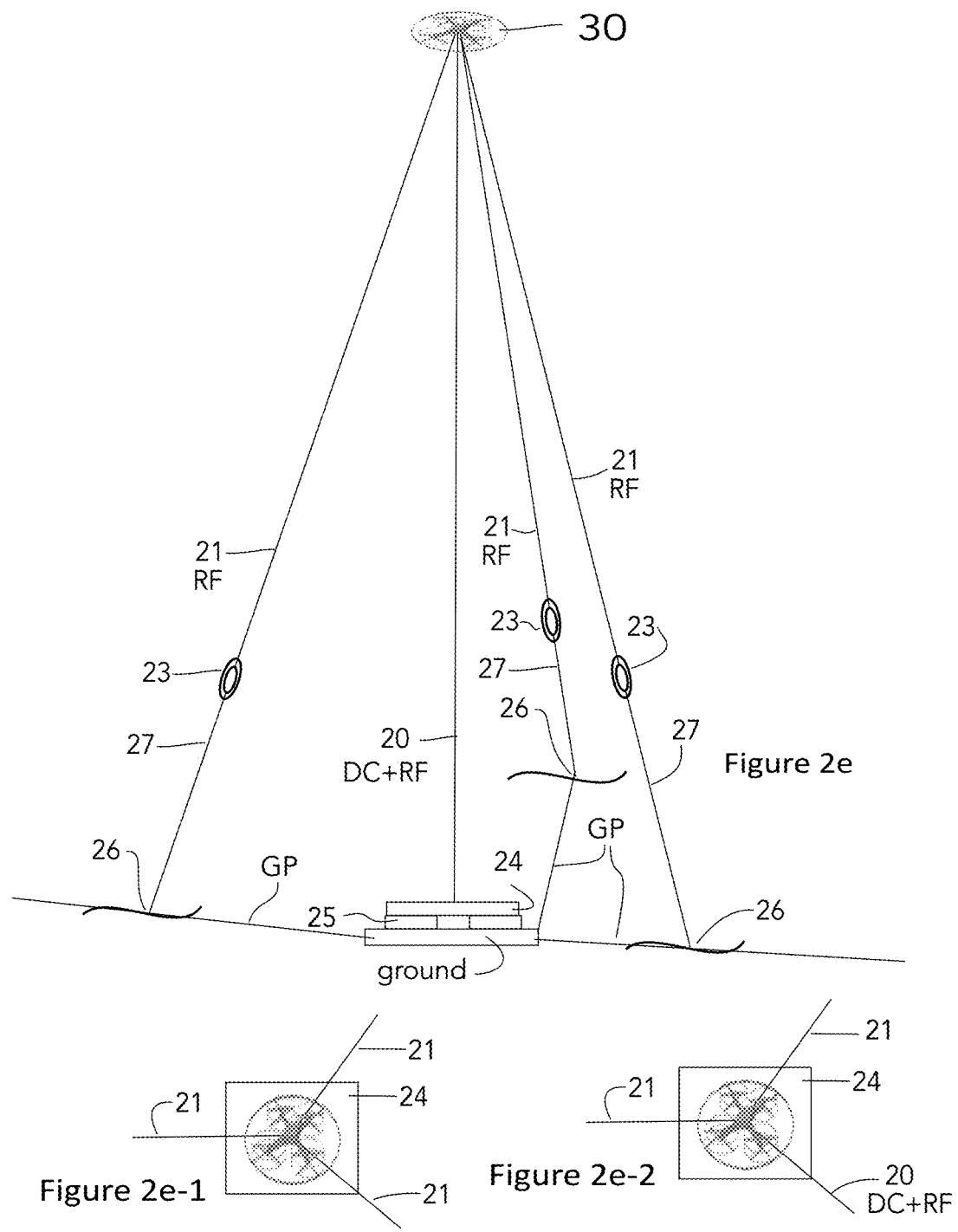

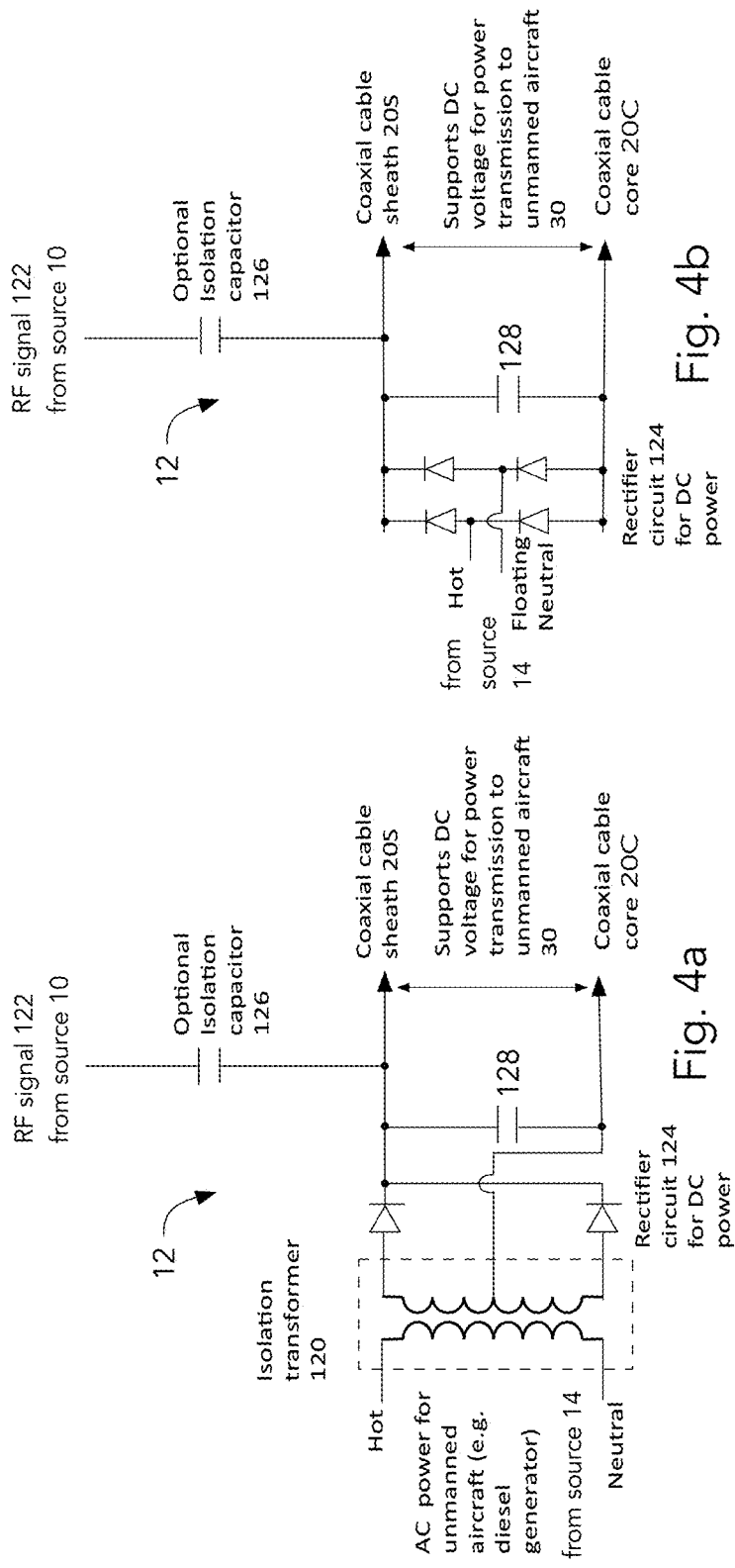

TETHERED UNMANNED AIRCRAFT ANTENNA

CROSS REFERENCE TO RELATED APPLICATIONS

This application claims the benefit of U.S. Provisional Patent Application Ser. 63/029,352 filed 22 May 2020, the disclosure of which is hereby incorporated herein by reference.

This application is related to the technology disclosed in U.S. Provisional Patent Application Ser. No. 62/872,045 filed 9 Jul. 2019 and entitled "An Array of VLF Scatterers for Control of Electromagnetic Wave Propagation on the Ocean Surface" and its related non-provisional patent application Ser. No. 16/870,784 filed 8 May 2020, the disclosures of which are hereby incorporated herein by reference.

This application is related to the technology disclosed in U.S. Provisional Patent Application Ser. No. 62/871,900 filed 9 Jul. 2019 and entitled "Distributed Semi-Autonomous Phased Arrays for Subsurface VLF Transmission" and its related non-provisional patent application Ser. No. 16/868,443 filed 6 May 2020, the disclosures of which are also hereby incorporated herein by reference.

TECHNICAL FIELD

An unmanned aircraft (such as a Vertical Take Off and Landing (VTOL) Unmanned Aerial or Aircraft System (UAS)) that utilizes an attached tether that may be used as a RF antenna. The VTOL UAS preferably has four or more motors and propellers for lifting the VTOL UAS and the attached tether to a desired height above the ground or the ocean.

BACKGROUND

A variety of Very Low Frequency (VLF) transmitter architectures have been proposed and investigated in the past. The most common types are large ground-based stations such as the Cutler station in Maine which provides one-way communication to submarines in the Navy's Atlantic Fleet. Typically, these large ground-based transmitters are constructed of one or a few very large top-loaded monopole structures designed to couple energy into the earth-ionosphere waveguide (EIW) and provide VLF coverage over a large portion of the earth.

U.S. Pat. No. 3,560,982 shows deployable transmitter architecture that utilizes a long wire antenna trailing behind an airplane to achieve VLF transmission from a single mobile platform. Yet another deployable VLF transmitter architecture employs aerostats and consists of a ground-based VLF source feeding a long conductor supported by a lighter than air object such as an aerostat or balloon (such as in U.S. Pat. Nos. 4,476,576 and 4,903,036). Another architecture is the NASA tethered satellite system (TSS) which was intended to string a long conductor between two satellites to enable VLF/ELF transmission from orbit (such as U.S. Pat. No. 9,527,608). While effective at generating VLF radiation all of these prior systems have relied on massive physical size to achieve efficient operation.

Aerostat antennas disclosed in U.S. Pat. No. 4,903,036 have a complex tension and orientation hardware system: "horizontally movable boom having at the end thereof a pulley or sheave member and the tether for the aerostat passed from the winch mechanism on a carrier structure, through the boom and around the sheave to the deployed aerostat."

BRIEF DESCRIPTION OF THE INVENTION

In the present disclosure, a VTOL UAS performs its own orientation control to maintain vertical positional station keeping through an embedded control system or surface commands preferably without the need for additional surface hardware. Furthermore, the VTOL UAS may provide tension control itself to accommodate ocean-based rigid body motions at the surface eliminating the need for a winch mechanism. A simple passive tension control device may be used (spring and damper system). Also, U.S. Pat. No. 4,903,036 requires a "an elongated sleeve transformer having a longitudinal central aperture" to transfer RF signals to the tether. Here, such custom transformers for RF coupling are not needed. Rather an isolation transformer is needed to couple and step up the DC power to RF voltages.

To counteract large surface rigid body vehicle motions or rotations associated with high sea state waves and winds, U.S. Pat. No. 9,233,733 describes a Mast stabilizing device. The presently disclosed technology uses a mass at the bottom of the mast, in water, and a spring attached to a buoy to act as a spring-mass-damper system to limit mast motions and to help the mast maintain a substantially vertical orientation desired in vertical antenna applications.

The presently disclosed technology is compatible with multi-node configurations. Multi-node is discussed in A. D. Watt, "VLF Radio Engineering," Pergamon Press, 1967. It may also be used to erect the antennas and scatterers described in U.S. Provisional Patent Application Ser. No. 62/872,045 filed 9 Jul. 2019 and entitled "An Array of VLF Scatterers for Control of Electromagnetic Wave Propagation on the Ocean Surface" and its related non-provisional Patent Application Ser. No. 616/870,784 filed 8 May 2020 and in U.S. Provisional Patent Application Ser. No. 62/871,900 filed 9 Jul. 2019 and entitled "Distributed Semi-Autonomous Phased Arrays for Subsurface VLF Transmission" and its related non-provisional patent application Ser. No. 16/868,443 filed 6 May 2020.

The technology disclosed herein is compatible not only with LF, VLF and ELF transmitters, but also with higher frequency transmitters, should that be desired. For example, this technology may also be useful for setting up an emergency transmitting station on the AM or FM bands and/or a cell site for mobile telephones and/or a repeater site for two-way radios (handheld or otherwise), for example, after a hurricane or earthquake, for example, has incapacitated traditional communication facilities. With this technology a station, cell site and/or a repeater could be on the air quickly and the UAS requirement would be pretty modest given the relative shortness of the tether compared to LF, VLF and ELF embodiments.

Technically, the recent commercialization of persistent VTOL UASs with efficient on-board DC-DC power converters, motors, high power density batteries, and fast embedded control systems make VTOL UASs a more capable host platform for heavy lift. As heavy lift VTOL UAS companies are burgeoning, powerful and efficient commercial off the shelf hardware is becoming readily available. See, for example, UASs being offered by Vulcan UAV Ltd of Gloucestershire, UK; Modus of San Diego, CA.; HSE-UAVs of Casselberry, FL; Volocopter GmbH of Buchsal, Germany; BFD Systenis of Pennsauken, NJ; and Hoverfly Technologies, Inc. of Orlando, FL.

Nevertheless, antennas of certain embodiments envisioned here increase by a factor of 7× the state of the art of common, commercial (FAA regulated) height capability. So certain embodiments of this invention push the limits of available technology to achieve heights that are easily achieved with aerostats, kites, parafoils and helikites. Despite power consumption for the VTOL UASs, they provide three primary benefits over aerostats: small ground and aerial footprint, no scarce helium consumption and replenishment, and maintaining vertical orientation (no "blow down") under extreme wind conditions so as to not diminish RF power transmission, frequency tuning or efficiency.

The combination of a tethered VTOL UAS antenna with an external power supply has not been considered due to the challenge of superimposing DC and RF power. While an isolation transformer solution is used in several different contexts, for example, lights for AM antennas and deicing of VLF antennas, its use to power a VTOL UAS has not to our knowledge been disclosed.

The presently disclosed technology utilizes a preferably heavy lift VTOL UAS, connected to a tether capable of transmitting DC power to the UAS at a target antenna height and simultaneously RF transmission power preferably with the help of a DC power isolation circuit and an appropriately lightweight, and preferably corona resistant coaxial tether. This approach may be useful in applications where the length of the antenna is short due to the rather long wavelengths involved and perhaps tha antenna length approaches 25% (or even less) of a wavelength. This can be particularly useful when the antenna is used at LF, VLF and ELF frequencies where the wavelengths corresponding to those frequencies are very long and thus a shorter antenna means less weigh in the tether to be carried aloft by the UAS.

Somewhat different approaches are taught for using a drone or UAS to erect antennas capable of use at higher frequencies, such as AM or FM broadcast frequencies, or for mobile phone cell sites and/or two-way radio repeater stations. Embodiments useful at these higher frequencies may find particular usefulness as emergency communication facilitates when traditional communication facilities have been temporarily disabled.

The tether for one or more UASs behaves as a RF transmission antenna in many embodiments and there are particular characteristics desirable to enable this functionality. Desirable technical attributes and features include one or more of the following:

(i) A coaxial cable that is sufficiently sized to handle RF voltages without inducing corona discharge along its length, RF+DC currents and/or tether tensions developed in flight.

(ii) The loiter height of the VTOL UAS determines the height of the RF monopole antenna. The VTOL UAS is preferably autonomous with a sufficiently robust control system that can maintain enough tension to keep the tether antenna substantially vertical without catenary slack.

(iii) The preferred antenna is a monopole. For frequencies of interest, this is an electrically short monopole, in which the RF wavelength is 100 m or greater and perhaps far greater. This monopole maybe supported by a single heavy lift VTOL UAS or multiple smaller VTOL UASs. However, better RF transmission electrical efficiency can be had with a top-loaded antenna configuration supported by multiple VTOL UASs. These multiple UAS configurations are accompanied by increased stow/deploy, control, and powering complexity.

(iv) The powering of the VTOL UAS preferably occurs through a DC isolation circuit that allows RF power to be transmitted concurrently with DC power via the tether. The coaxial cable sheath and core of the tether therefore should be sized to handle both the RF and DC currents. Due to the larger surface area and larger radius of curvature, the RF voltage is preferably carried on the outer sheath conductor. We believe the use of such a system for the purpose of powering a VTOL UAS is novel.

(v) A coaxial tether cable that is lightweight, with linear mass densities between 16 and 100 g/m. Preferably between 24-80 g/m and most preferably between 45-65 g/m.

(vi) The coaxial cable sheath is preferably of sufficient diameter to resist corona discharge. For 100 kV RF operation voltages, a diameter of greater than 1 inch may prevent corona in salt fog conditions. This is achieved with a sufficiently low foam isolation coaxial cable, or more preferably, an air insulation coaxial cable.

(vii) Stowability/deployability: A highly stowable antenna even for LF, VLF, and ELF RF frequencies requiring a long tether. The antenna and support vehicle can stow in a ~2 m×~2 m×~2 m volume for an antenna tether between 500-1000 m in length. This offers stowability and operational support advantages for minimizing size and weight on either a maritime or land-based platform. This offers the ability to conceal the antenna from third parties including adversaries nearing the antenna vicinity. For antennas used at AM or FM or telephone or two-way radio communications, the antenna length is much more modest making the antenna even more easily deployable and the storage volume requirements much less in size.

(viii) The supportable height for a quadcopter type vehicle may potentially approach that of other rotorcraft, 10000 m. Winged VTOL aircraft circling in a figure eight pattern may achieve high altitudes with greater efficiency than rotorcraft. So the disclosed technology is not limited to the use of the type of UASs depicted in the figures.

(ix) The disclosed technology decouples the physical/mass stability of the parent transmitter from the antenna, allowing substantial rigid body motions of the transmitter (such as due to wave action) from the orientation of the antenna, vs a mast antenna. The only consumable for this configuration is energy (which may be supplied by a petrochemical, for example), whereas for an aerostat solution, scarce helium needs frequent replenishment. With a lower aerial cross-section than an aerostat, it is easier to maintain antenna orientation in high winds.

(x) The disclosed technology may be utilized to support mobile antennas, on the road or out in bodies of water such as the open ocean.

In one aspect the present invention provides an antenna system comprising at least one VTOL UAS with an embedded flight control system for UAS flight control, the VTOL UAS, in use, being powered via coaxial tether by a DC circuit coupled with a RF transmitter to simultaneously power the UAS and radiate RF energy from the tether, the tether thereby acting as an antenna of said antenna system when the VTOL UAS is, in use, airborne.

In another aspect the present invention provides a tethered unmanned aircraft antenna system comprising a vertical take-off and landing (VTOL) Unmanned Aerial System (UAS) system, which is constrained, in use, by a tether connected at one end to a maritime or land-based platform and at another end to the VTOL UAS, the tether also being used as a RF antenna.

In yet another aspect the present invention provides a tethered unmanned aircraft antenna system comprising a vertical take-off and landing (VTOL) Unmanned Aerial System (UAS) system, which is restrained, in use, by multiple tethers, at least three of said multiple tethers being connected at one end to the VTOL UAS and at the other ends thereof to multiple spaced-apart locations, the at least three of said multiple tethers restraining lateral motion of the VTOL UAS when the at least three tethers are fully extended, during use, by an airborne lifting action of the VTOL UAS, at least one of the multiple tethers being useable as a RF antenna when the VTOL UAS is airborne.

In yet another aspect the present invention provides a method of deploying an antenna comprising providing at least one Unmanned Aerial System (UAS) aircraft, constraining a height that the at least one UAS can fly by a tether connected at one end to a maritime or land-based platform or vehicle and at another end to the UAS, and allowing an exterior conductive sheath of the tether to be used as an RF antenna when suitable RF energy is applied thereto. The suitable RF energy is preferably supplied by an RF transmitter located closer to the maritime or land-based platform or vehicle than the UAS to the maritime or land-based platform or vehicle when the height that the UAS can fly is constrained by the tether.

BRIEF DESCRIPTION OF THE DRAWINGS

FIGS. 2a-2d are side elevational views of several different antenna configurations supportable by one or more VTOL UASs.

FIG. 2e depicts a side elevational view while FIG. 2e-1 presents a plan view of an embodiment of an antenna configuration supportable by one or more VTOL UASs which utilize additional tethers for VTOL UAS stationkeeping. The additional tethers may be formed, in part or in toto, by non-conductive wires or ropes. FIG. 2e-2 presents a plan view where one of the tethers used for station keeping is also utilized as an antenna element along its entire length.

FIGS. 4a and 4b depict two possible configurations for isolating/stepping-up the DC VTOL UAS power at the RF voltage. These circuits may combine an isolation transformer with a rectifier and DC voltage isolation capacitor to achieve DC power transmission and simultaneously carry a high voltage RF signal.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of U.S.C. 112, Paragraph 6.

Figure 1:
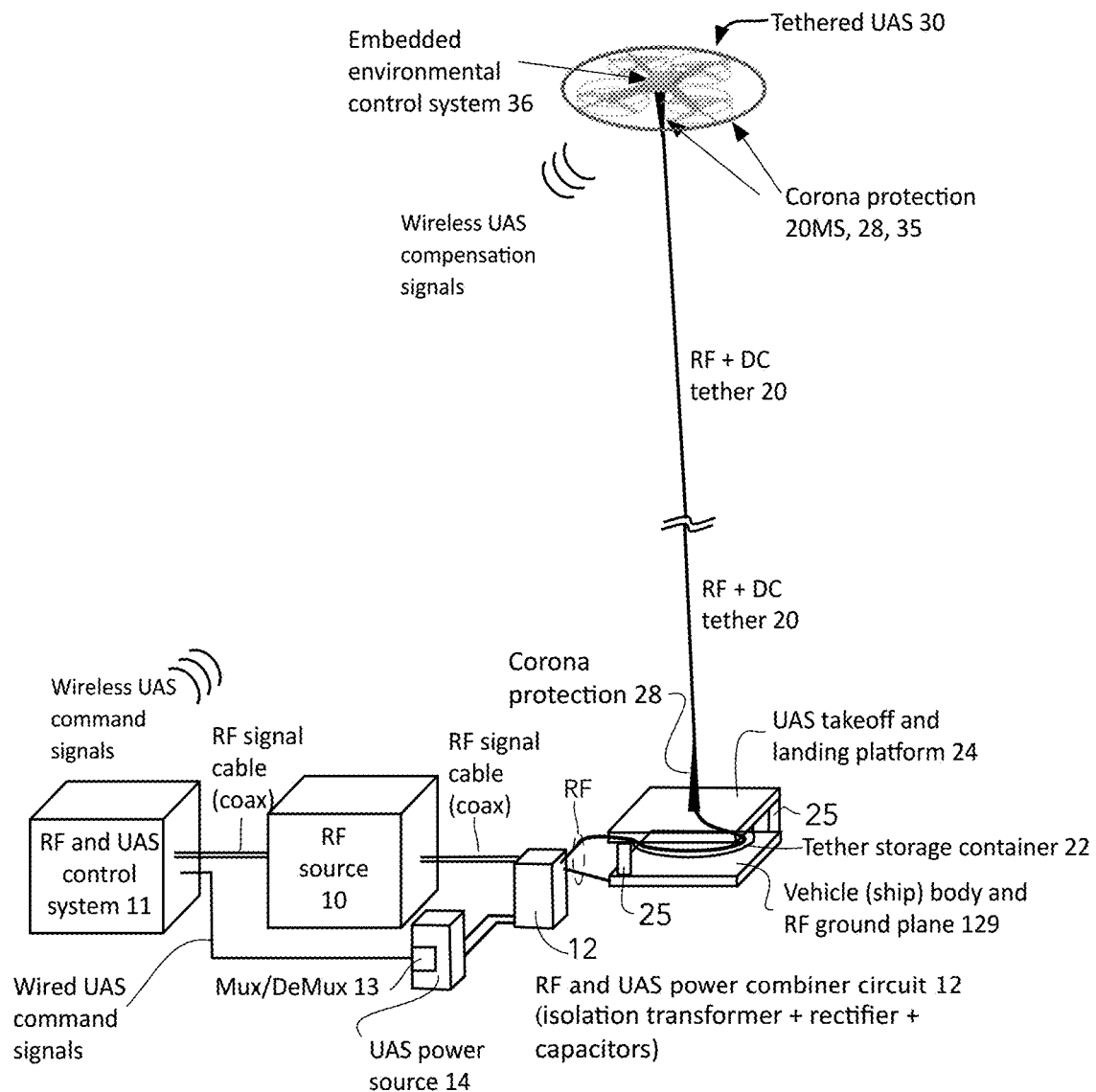
FIG. 1 depicts the primary parts of the tethered unmanned aircraft antenna system.

FIG. 1 shows the primary parts of the tethered unmanned aircraft antenna system disclosed herein, including some parts that are optional. A RF source 10 produces high voltage and associated currents that are fed into a DC isolation circuit 12. A UAS power source 14, which may be, for example, a diesel generator, also feeds power into the RF and UAS power combiner circuit 12 (see also FIGS. 4a and 4b). The output of the circuit 12 is to the base of the tether 20 or to a rigid conductor that feeds into the coaxial cable tether 20. The signal that comes from the DC isolation circuit 12 is preferably at high voltage (~100 kV) and 10's of amps of current.

Figure 5:
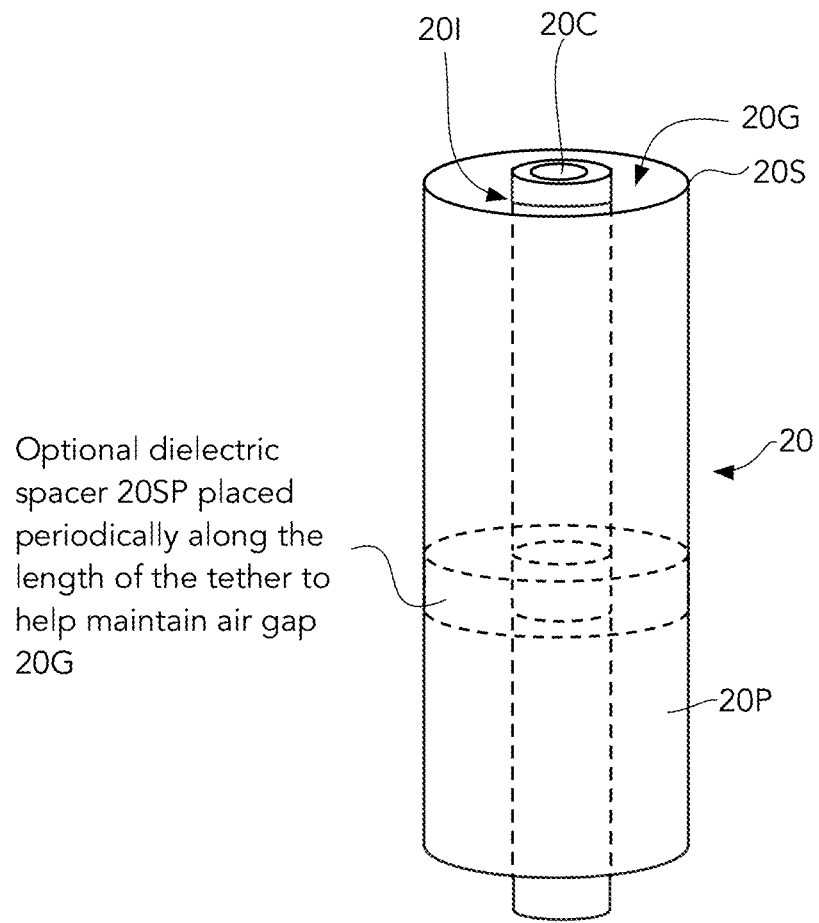
FIG. 5 depicts a perspective view of an embodiment of the tether and FIG. 5a depicts a perspective view of another embodiment of the tether which includes an optical fiber or cable that wraps around a centrally disposed insulated core inwardly of the outer sheath.

The tether 20 is preferably embodied as a flexible coaxial cable that comprises two primary electrically conductive components: a lightweight core metallic 20C with insulation to withstand the operational DC voltage and a metallic sheath 20S that carries both the RF and DC power (see also FIG. 5). The insulation may be provided by an air gap 20G. Some embodiments of the tether 20 include a fiber optic cable 20F (see FIG. 5a). To provide flexibility while handling the tether 20, the lightweight core metallic 20C may be embodied as stranded aluminum while the sheath 20S may be a braided metallic material such as aluminum, nickel or copper clad with a noble metal. Due to the diameter of the sheath 20S desired to prevent corona along its length (under salt fog conditions, for example), the sheath 20S may be a corrosion resistant metal and/or may be a metal with a polymeric coating 20P applied to it that not only provides added environmental corrosion resistance but also helps the braid of the sheath 20S maintain a desirable circular form, which in turn helps prevent sharp edges that might cause corona to occur is use. The tether 20 is preferably fed through an insulating storage container 22 that preferably houses a passive tension management system for the tether 20, the tether 20 being fed out a port in the container 22 located at or near the center of the UAS take-off and landing platform 24. The takeoff and landing platform 24 is preferably electrically conductive and this may be formed of a metal or at least include a metallic UAS take-off and landing surface. Corona protection, such as provided by a conductive cone 28 that is in sliding/rolling electrical contact with outer surface 20S of the tether 20 where the tether 20 exits the port in container 22 is desirously provided to prevent excessive surface charge buildup on the tether 20. The tether 20 can be 250 m or greater in length so that when extended by UAS 30 it supports transmissions at VLF. The tether 20 terminates at its distal end at the underbelly of the VTOL UAS 30 and terminates at is proximate end with connections to circuit 12.

The UAS 30 in some embodiments may fly autonomously or in other embodiments may fly under control of the RF and UAS control system 11. If under control of the RF and UAS control system 11, then command signals provide position control instructions (the UAS command signals) that be communicated wirelessly or via a wired circuit to the UAS 30. The wired circuit, if used, may include a separate communication circuit embodied, for example, in the optical cable 20F of the tether 20 or it may be embodied with the DC carrying components 20C and 20S of the tether 20 (with suitable multiplexing and demultiplexing means at or near the takeoff platform and on the UAS 30) assuming that the communication circuit (whether wireless or wired) is a two-way communication circuit, allowing the UAS 30 to communicate information regarding its status (compensation signals) back to the RF and UAS control system 11.

As such, FIG. 1 depicts wireless command signals emanating from UAS RF and Control System 11 to be received by the UAS 30 and compensation signals emanating from the UAS 30 to be received by the UAS RF and Control System 11. The position of the UAS 30 relative to the transmitter RF ground plane 129 (which could be the ocean when this technology is utilized aboard a ship) is important to establish the effective height of the antenna provided by shield 20S (see FIGS. 4, 4a, 5, and 5a) of the tether 20 and thereby optimize the transmission of a VLF (for example) signal. This relative positioning may be established with wireless command signals from the RF and UAS control system 11 (preferably co-located at the transmitter site as shown in FIG. 1). Instead of communicating control signals and information wirelessly, such signals and information may be communicated optically on an optical fiber 20F (see FIG. 5a) or may be multiplexed (see Multiplexer/Demultiplexer 13) with the DC, for example, applied to the UAS 30 by the UAS power source 14. Alternatively, instead of wireless or DC multiplexed or optical communication (or in addition thereto) the UAS 30 may possess a control system (see FIG. 3a or 3b, element number 36) allowing it to make its own (autonomous) determination regarding its relative positioning needed to maintain an effective height and/or location.

When making non-autonomous determinations for position control, the UAS 30 and the UAS control system 11 may communicate either wirelessly or via the aforementioned wired circuit so that the UAS 30 may accurately adjust height and/or location (position control) as needed. The UAS 30 may communicate these command/compensation signals wirelessly, or alternatively via the DC applied to the UAS 30 and Mux/DeMux 13 or via the aforementioned optical fiber 20F. If the command/compensation signals are transmitted and received via the DC power applied to the UAS 30 on tether 20, then element 36 (see FIGS. 3a and 3b) would preferably include a multiplexer/demultiplexer compatible with Mux/DeMux 13 shown on FIG. 1.

FIGS. 2a-2e depict several different antenna configurations potentially supportable by a VTOL UAS 30. Whether RF is fed by each of the tethers 20 shown in FIG. 2a-2d, will depend on the type of antenna system being implemented with the UASs 30 and the type of antenna system being implemented will also dictate whether the members 40 connecting the UASs 30 are conductive wires (and thus form part of the antenna system supported by the UASs 30) or non-conductive ropes. In the embodiments of FIGS. 2a-2d, the tethers 20 all emanate from a single landing platform 24, while in the embodiment of FIG. 2e, a central tether 20 emanates from a single landing platform 24, but other tethers are tied or otherwise fixed to earth. The other tethers may include a conductive portion 21 (that may serve as a capacitive top hat for the antenna, if desired) and is coupled with the antenna element in tether 20 and another portion 27 that is tied to earth. The another portion 27, if non-conductive, may be formed from a non-conductive (e.g., plastic) rope or, if conductive, may be formed by a metal wire connected to conductive portion 21 by means of a ceramic or plastic insulator 23. If no capacitive top hat is desired, then each of the tethers otherwise formed of the two portions 21 and 27 may be combined into single tether preferably formed of a non-conductive rope material.

The embodiment of FIG. 2e is intended for use (typically in emergency communication situations) at a fixed point on land as there is a need to secure the other tethers (comprising portions 21 and 27) to earth at three or more fastening points 26. The UAS 30 in the embodiment of FIG. 2e may fly autonomously as it only needs to raise the tether to a point where it is positionally constrained by the tether 20 and the other ropes or wires 21/27, as is discussed in more detail below. The embodiments of FIG. 2a-2d, preferably having only a single point of attachment (to the landing platform 24 via tether 20), can be conveniently used on a vehicle such as a ship at sea (see numerals 29 in FIGS. 2a-2d) or even a land vehicle.

When used on a ship at sea, the landing platform 24 should be electrically isolated by insulating standoff structures 25 from the presumptively metal structure of the ship (represented by element numbers 29 in FIGS. 2a-2d). The metal structure of the ship and the surrounding ocean preferably functions as a ground plane for the vertical antenna embodiments of FIGS. 2a-2d.

Besides a single (see FIGS. 2a and 2e) VTOL UAS monopole antenna configuration, embodiments with multiple VTOL UASs 30 are also envisioned (again for a monopole antenna). FIG. 2b shows multiple UASs 30 strung along a single tether 20 to support a heavier or taller monopole antenna. Managing the slack in the segments of tether 20 segments becomes an important factor to maintain operation. Thus, tension measurement and UAS 30 reaction to the changes in tension may be critical, lateral motions may not affect antenna radiation, but may help alleviate tension variations that lead to slack and tether entrainment in flight motors. FIG. 2c shows a Tee antenna arrangement with conductive wires 40 between the UASs 30 which adds capacitive top loading, reducing the total height required to achieve the same radiated power as the monopole embodiments of FIGS. 2a and 2b. In the embodiment of FIG. 2c, lateral motion control of the multiple VTOL UASs 30 should be synchronized (easily accomplished with commercial off-the-shelf (COTS) swarm algorithms) to maintain the capacitive arm positions in place with the multiple VTOL UASs 30. FIG. 2d shows more VTOL UASs 30 needed to achieve a "clothesline" top-loaded antenna with conductive wires 40 which again further decreases the required height, but at the expense of more UASs 30 simultaneously being airborne, the associated DC power draw and the added complexity of the control systems between each UAS 30 in order for them to maintain formation (station keeping).

The embodiment of FIG. 2e avoids the need for station keeping software (and associated control systems) since the three (or more) other tethers (comprising portions 21 and 27), when fully extended, should restrain the single VTOL UAS 30 from lateral motion allowing it to fly autonomously. FIG. 2e-1 presents a plan view of the embodiment of FIG. 2e. FIG. 2e-2 presents a plan view of an alternative embodiment where one of the tethers used for station keeping is also the tether 20 utilized as an antenna element (along its entire length), thereby avoiding the need for the central tether 20 (utilized as an antenna element along its entire length) of the embodiment of FIGS. 2e and 2e-1.

Thus, the embodiments of FIGS. 2e, 2e-1 and 2e-2 are simple to erect and maintain by emergency personnel when emergency communication facilities are needed to be deployed urgently. The tether 20 can carry DC to power the UAS 30 and provide an antenna for an emergency AM or FM broadcast station, for example. The UAS 30 of FIG. 2e may be equipped with additional relatively short antennas (and associated transceivers) to function as a mobile telephone cell site and/or a two-way radio repeater. Power for such transceiver(s) may be supplied by the DC on tether 20 and any desired non-wireless communication channels with such transceivers may be carried on the fiber optic cable 20F (see FIG. 5a) embedded in tether 20.

The embodiment of FIG. 2e may have a purposefully deployed ground plane GP extending as three or more metal wires along the earth between a point adjacent the landing platform 24 and extending out towards (and possibly past) the fastening points 26, for example. The three or more fastening points 26 may be formed by metal rods or screws driven (pounded, threaded) into the earth and the metal wires of the ground plane GP may be electrically coupled thereto.

Figure 3A:
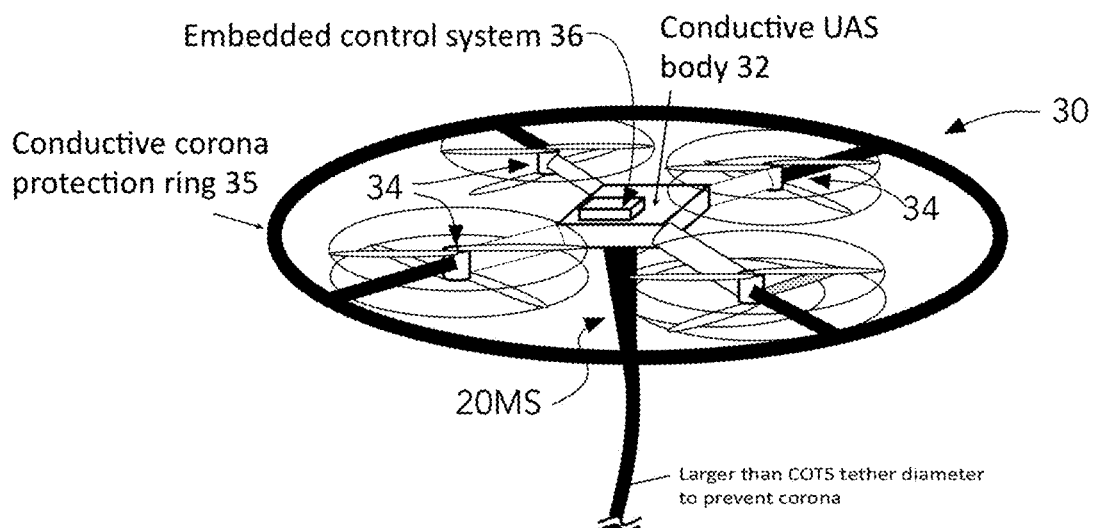
FIGS. 3a and 3b show two adaptations or embodiments of a VTOL UAS for use as the termination for a RF monopole antenna.
Figure 3B:
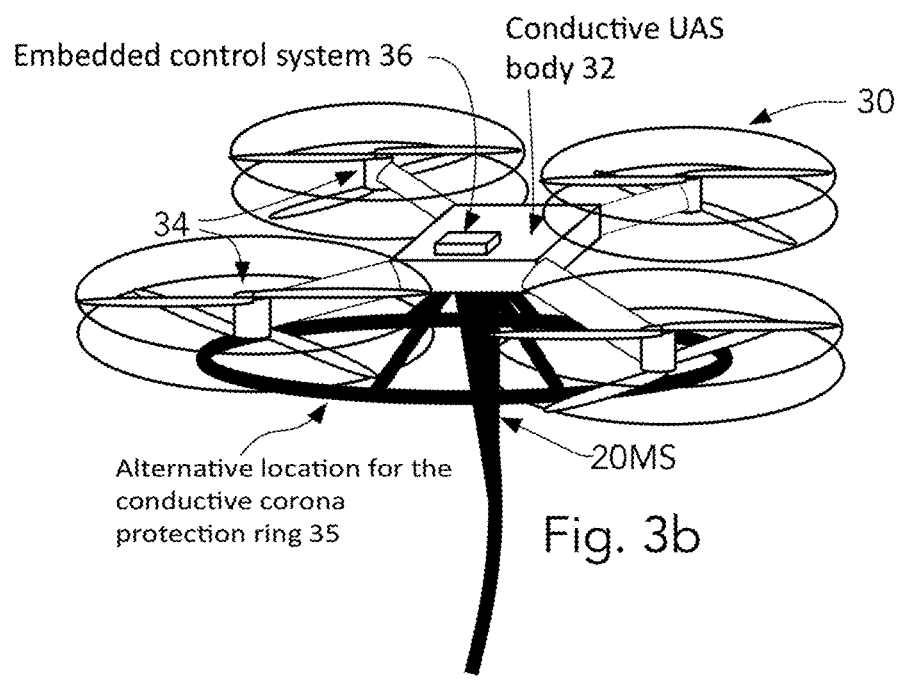

Turning now to FIGS. 3a and 3b, the exterior of the body 32 of the VTOL UAS 30 is preferably mostly conductive (with preferably no sharp edges) to distribute RF charge and prevent build up that could damage VTOL UAS flight motors 34. One exception would be for a small antenna (not shown) for wireless receipt of UAS command signals. A conductive perimeter corona protection ring 35 may be added if needed or desired, the ring being ohmically coupled with the conductive body 32 of the UAS 30. Two different embodiments of the conductive perimeter corona protection ring 35 are depicted by FIGS. 3a and 3b. In FIG. 3a the conductive perimeter corona protection ring 35 is disposed outwardly motors 34 while in the embodiment of FIG. 3b, the conductive perimeter corona protection ring 35 is dis-posed under, and attached to, body 32. The conductive UAS body or surface 32 also aides in thermal energy dissipation. The UAS preferably carries aboard a DC-DC power converter to reduce the DC voltage on the tether 20 (which may be several kilovolts) to voltage(s) more conveniently used by the UAS, its motors and other electronic equipment carried by it. The conversion efficiency of such a DC-DC power converter is only ~90%, so there is some amount of heat (i.e., thermal load) that is generated during conversion and that needs to be dissipated. Because the UAS body or surface is electrically conductive, it is, in general, also thermally conductive. This can aid in conducting and distributing heat away from the DC-DC converter. It can also assist in radiating away the heat load.

The tether 20 may weigh 50-60 g/m for 250 kg of tensile strength and 150 A of current carrying capacity and yet remain light enough for the VTOL UAS 30 to achieve a desired height with reserve capability for wind gusts, rain or vertical motions.

The VTOL UAS 30 has an on-board flight motor control system 36 which, in one embodiment, is in wireless communication with the RF and UAS control system 11 (see FIG. 1) which can send command signals to the UAS 30 for it to take off, attain a desired altitude and return to the UAS 30 take-off and landing platform 24 by controlling its motors 34. The wireless communication between the UAS and the RF and UAS control system may be at RF frequencies (such as VHF or UHF or even higher frequencies) that are sufficiently different from the RF transmitted from the tether 20 so that the RF transmitted from the tether 20 does not interfere with the wireless communication between the UAS 30 and the RF and UAS control system 11. Alternatively, the command signals maybe multiplexed with the RF and/or DC on the tether 20 or transmitted via an optical fiber 20F (see FIG. 5a) embedded in the tether 20.

FIGS. 3a and 3b shows relevant adaptations of VTOL UAS 30 for use as the termination for a RF monopole antenna. These mostly refer to the electrically and thermally conductive surfaces to help spread heat and charge. An added perimeter corona ring 35 may help draw potential corona charge away from the VTOL UAS 30 electrical systems in the central body, thereby helping to increase UAS lifetime and longevity. In certain embodiments (see the embodiments of FIGS. 2c and 2d, for example) one or more of the UASs 30 are connected to tether 20 which only carry DC (to power the UAS), and thus for those embodiments corona protection may be omitted as their tethers 20 need not carry RF energy.

FIGS. 4a and 4b depict two possible circuit configurations 12 for isolating/stepping up the DC VTOL UAS power at the RF voltage. As will be seen, RF energy is applied between the exterior sheath 20S (see FIG. 5a, for example) of tether 20 and a ground plane (which may comprise a ship 29 and its surrounding ocean or a purposefully deployed ground plane GP as shown in FIG. 2e). The ground plane may be omitted but that may compromise the ability of the sheath 20S in tether 20 to radiate a desirable RF pattern.

These circuits 12 may combine an isolation transformer 120 with one or more rectifiers 124 and an optional DC voltage isolation capacitor 126 to achieve DC power transmission while simultaneously carrying a high voltage RF signal 122 from RF source 10 to the sheath 20S of the tether 20 while DC energy is applied between the sheath 20S and core 20C of the tether 20. Capacitor 126, if used, will keep the DC power on tether 20 from damaging RF power amplifiers at RF source 10. Capacitor 128 is a filter capacitor preferably utilized to reduce AC ripple on the DC power being generated. The embodiment of FIG. 4b, which is depicted without an isolation transformer, may include one, if desired, and would preferably include one if the neutral were grounded, as opposed to floating.

In these circuits the positive side of the generated DC is coupled to the sheath 20S of the tether 20 while the negative side is of the generated DC is coupled to the core 20C of the tether 20, but these connections may be reversed, if desired. It should be noted that the generated DC is preferably floating compared to the generated RF signal including its ground plane (which may be the body of a metallic hull ship or grounding straps intimately connected to sea water or other earth ground).

The circuits of FIGS. 4a and 4b utilize full wave rectification. Other circuit designs may be used instead and, indeed, may employ half wave rectification instead of full wave rectification. The circuits of FIGS. 4a and 4b may be modified to include the multiplexer/demultiplexer 13 of FIG. 1 if control and or compensation signals are to be communicated via the DC transmission circuit formed by core 20C and sheath 20S of tether 20.

In the embodiments of antenna depicted in the FIGS. 2a-2d, there is only one monopole (implemented by a single tether 20 carrying RF and often functioning as an electrically small antenna, while in some embodiments it may possibly be a full height antenna. Whether the antenna is a full height (quarter wave, for example) or an electrically small antenna will depend on a number of factors, including the weight carrying capability of the UAS 30 and possible interference with other aircraft. Electrically small antennas exhibit capacitive reactance. Capacitor 128 in FIGS. 4a and 4b preferably has higher capacitance than the antenna capacitance (if electrically small) such that the two conductors of the tether are at the same RF potential (i.e., at common mode). The top-loading effect of the UAS 30 alone should be inconsequential to the capacitive reactance of the antenna.

One feature of this technology is the ability multiplex the differential mode DC voltage produced by the DC power supply 14 (examples of which are shown in FIGS. 4a and 4b) with the preferably common-mode RF voltage 122 (of the RF signal from source 10), which could be many kV or more, onto a single coaxial tether 30 having just a center conductor 20C and a spaced apart outer sheath 20S.

If the antenna is electrically small (so it is typically much less than a quarter wavelength antenna in length needed for antenna resonance) then the base voltage will be current times reactance (it will be higher than the RF amplifier voltage due to resonant tuning). If the antenna is resonant it will be current times resistance, which is lower, so one can try to drive more RF current.

FIG. 5 shows a coaxial cable core 20C with a single conductor with insulation layer(s), preferably of a foam material, 20I to support the DC voltage with an optional air gap 20G between the coaxial cable core 20C and the coaxial cable sheath 20S. The air gap 20G is optional and, moreover, the air gap 20G, if used, may be conveniently incorporated with spacers 20SP periodically positioned along the length between the core 20C and sheath 20S or with low density foam electrically insulating material 20I to improve its dielectric constant using techniques known in the coax cable making art.

Figure 5A:
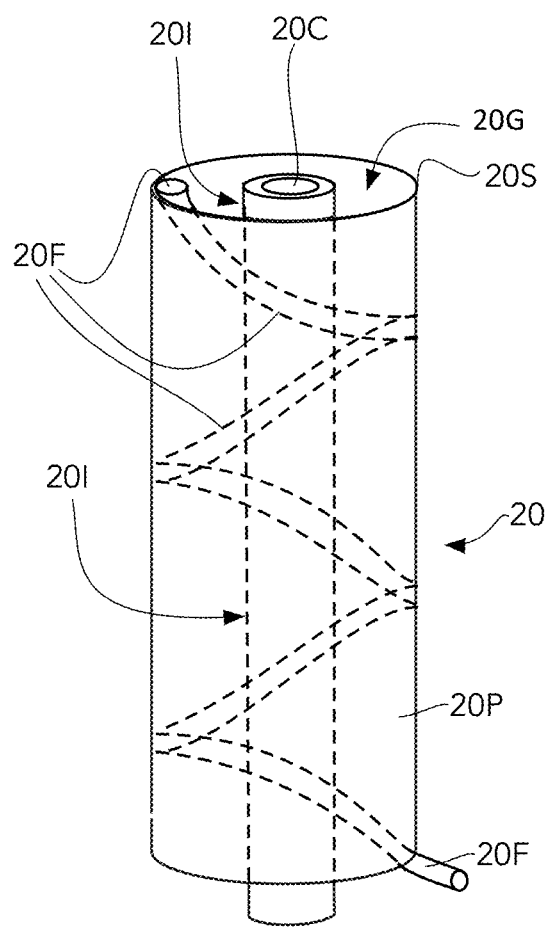

FIG. 5a depicts a perspective view of another embodiment of the tether 20 which includes an optical fiber or cable 20F that wraps around a centrally disposed insulated core inwardly of the outer sheath. The optical fiber or cable 20F may follow a helical path and its diameter may equal the width of the air gap 20G (discussed below) so that optical fiber or cable 20F contacts both an outer surface of the core 20C and an inner surface of the sheath 20S as opposed to being spaced from the core 20C as is depicted in FIG. 5a.

Figure 6A:
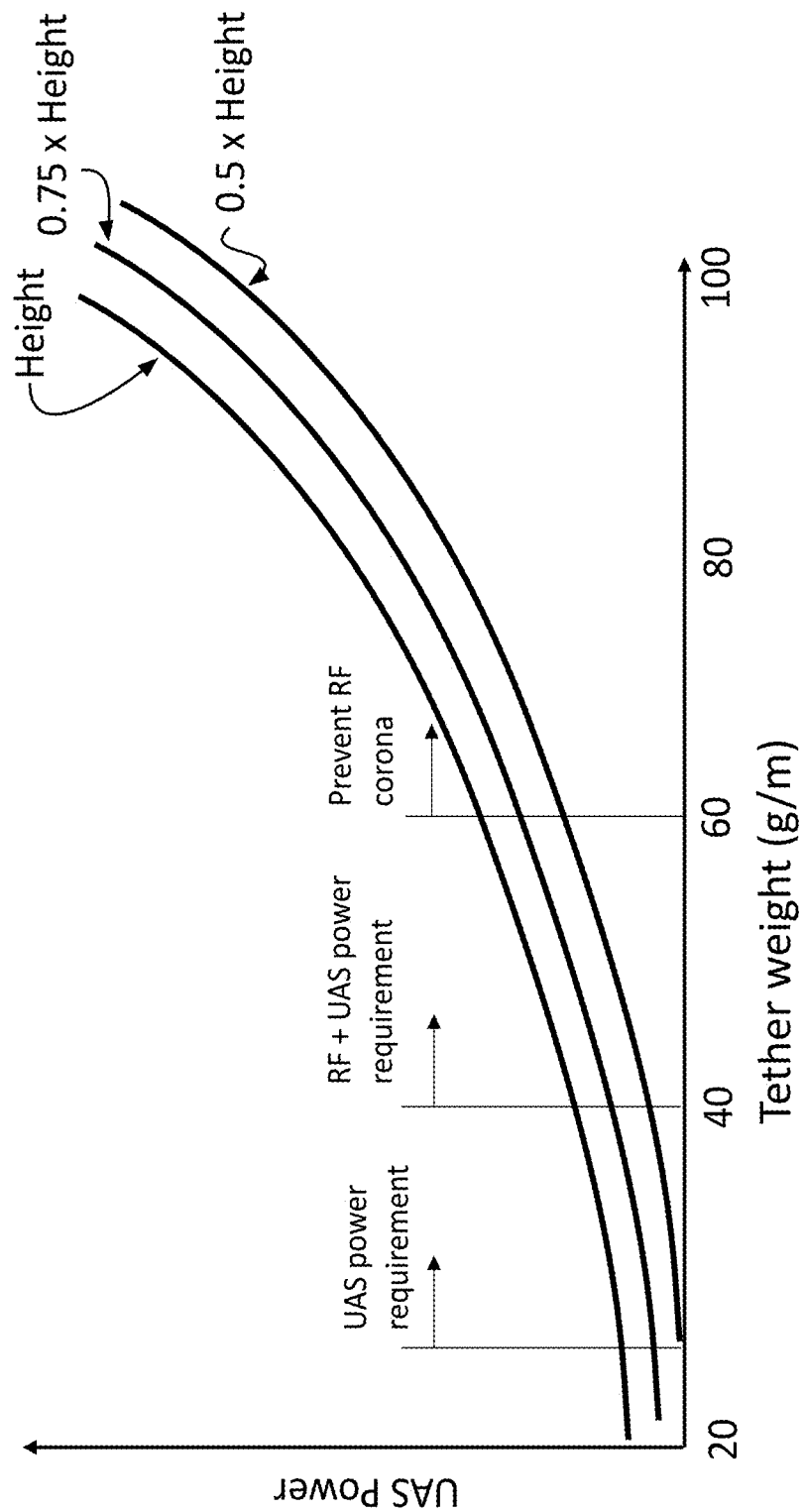
FIGS. 6a and 6b show two examples of the possible power requirements to keep the VTOL UAS aloft with environmental overhead at max achievable height (for example, in meters) as a function of tether linear mass (for example, in grams/meter).
Figure 6B:
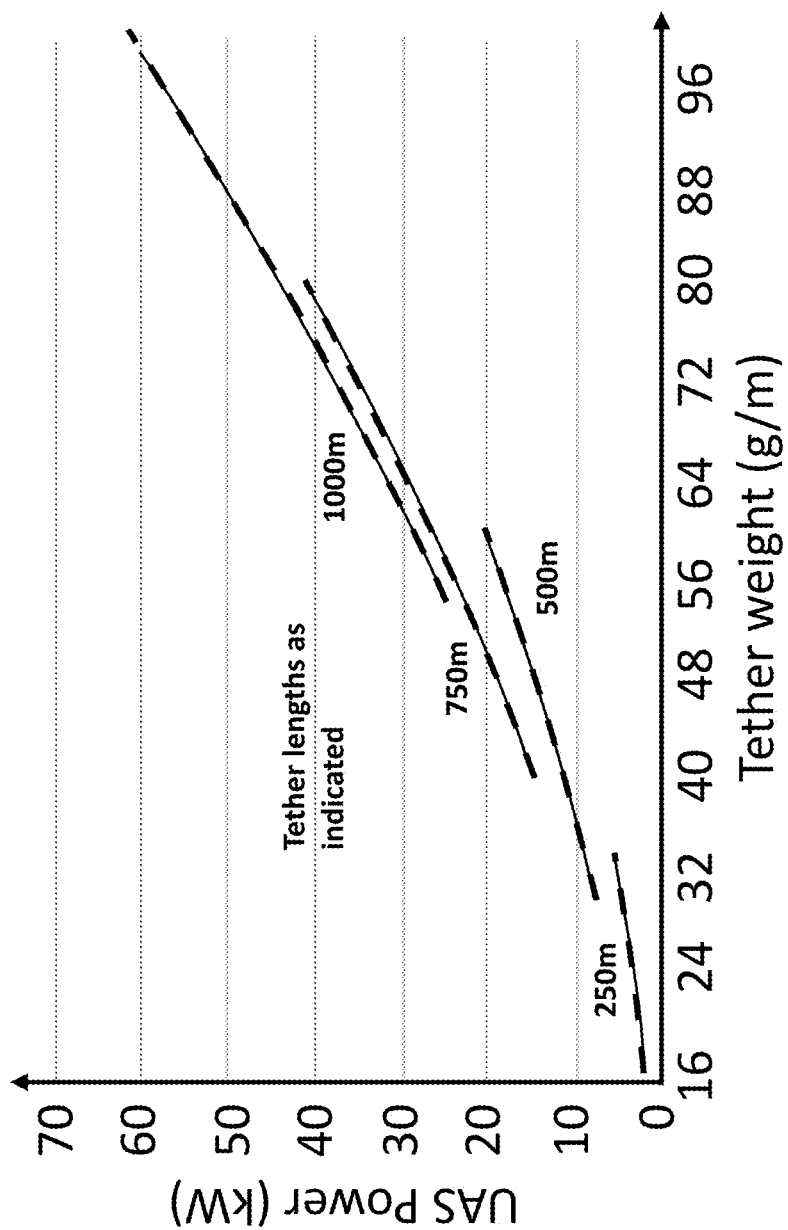

The critical parameters are (i) the insulation 20I around the metallic core 20C which keeps the core 20C from arcing/shorting to the sheath 20S and (ii) the diameter of the sheath 20S. An air gap 20G (or even a vacuum) can provide all or a portion of the insulation between the metallic core 20C and the metallic sheath 20S. The air gap 20G may be partially filled with the optical fiber or cable 20F mentioned above. The coaxial cable sheath 20S preferably comprises a lightweight, corrosion resistant stainless steel+Ni clad Cu filamentary braid shield 20S with an optional, but preferable, polymeric coating 20P on the interior and/or exterior surface (s) of the sheath 20S to improve its shape-keeping abilities. The sheath's outer diameter is preferably sized to avoid corona discharge. However, high RF voltages can induce corona, forcing increased radius of curvature, increasing diameter and associated mass of the tether 20. This combination of current capacity, low linear weights, and larger diameter is only supportable by several products: Aluminum braids and stainless steel/NiCu hybrid braids. The latter being solderable with high bend and tensile fatigue failure resistance. The coaxial tether cable 20 is desirously lightweight, with linear mass densities between 16 and 100 g/m. Preferably between 24-80 g/m and most preferably between 45-65 g/m. The coaxial cable sheath 20S should be of sufficient diameter to resist corona discharge. For 100 kV RF operation voltages, a diameter of greater than 1 inch may prevent corona even in salt fog conditions. This is achieved with a sufficiently low low-dielectric-constant foam isolation coaxial cable, or more preferably, an air gap 20G insulation coaxial cable. These sheath requirements may be met with a stainless steel/Ni clad Cu braid 1.25 inch diameter braid product number 103-051-040 or a 1.0 inch in diameter cable product number 103-051-032, both from Glenair, Inc. of Glendale, CA. FIGS. 6a and 6b show two examples of possible trade-offs between required power to stay aloft as a function of achievable height and tether linear mass.

Figure 5B:
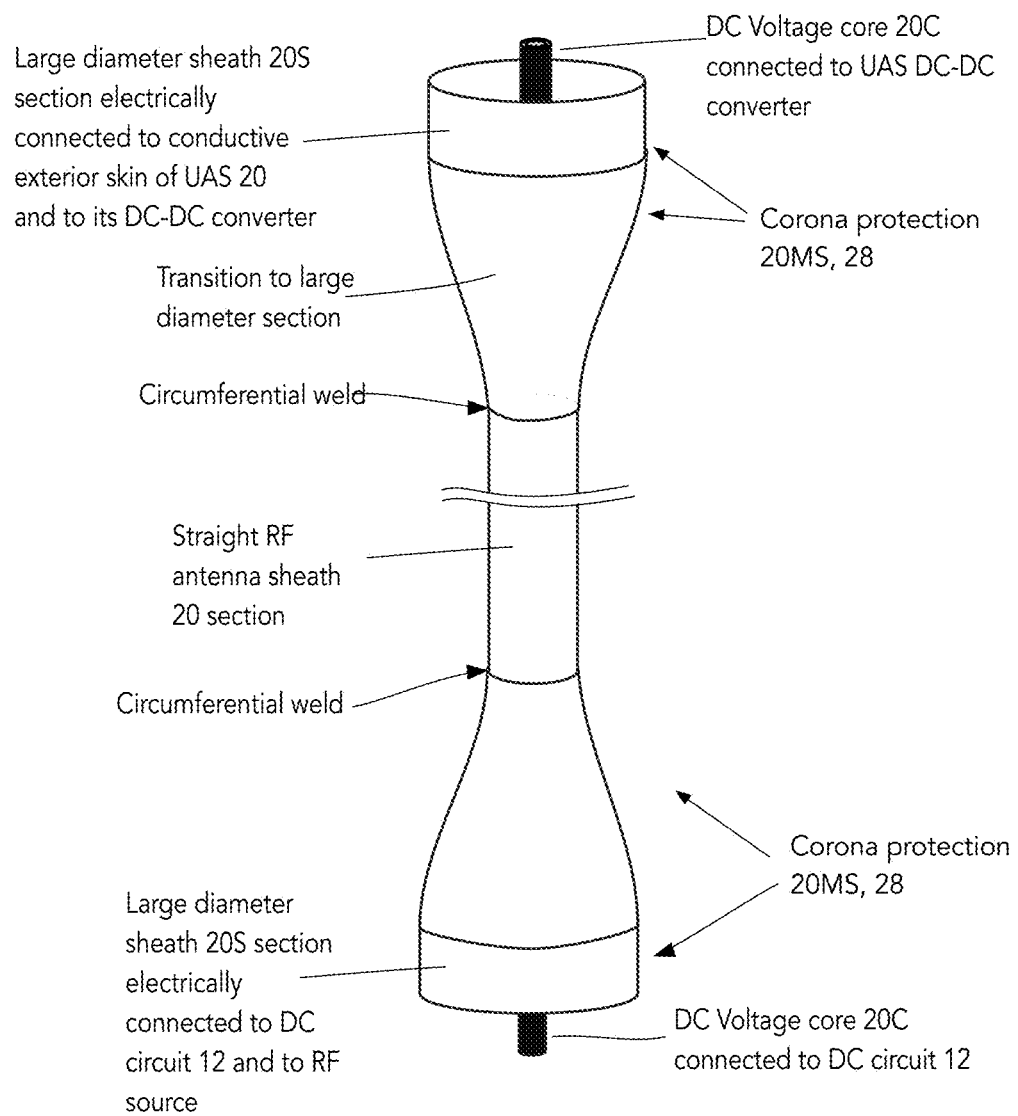
FIG. 5b depicts the tether with corona protection at its ends provided by increasing the diameter of the outer shield of the tether at those ends.

An alternative embodiment, shown in FIG. 5b, provides the tether 20 with two (or more) coaxial sheaths of varying diameters 20MS, for example, at the bottom and the top of the tether 20, especially over those portion(s) of the tether 20 immediately adjacent its top and/or bottom of its main portion to increase the outer diameter of the tether 20 where it attaches at its top to a UAS 30 and/or at its bottom where it attaches or is held by the UAS take-off platform 24 and tether storage container 22 as corona protection 28. These multiple sheaths of varying diameters 20MS should be connected together (and to a main portion of the tether between them) by welding or soldering as they decrease in diameter to mate with the sheath 20S of the main portion of the tether. The tether 20 having multiple sheaths 20MS, for example, at selected locations provides additional corona protection 28 at those locations. The core 20C passes continuously from the bottom of the tether 20 to its top.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of. . . . "

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. An antenna system comprising at least one vertical take-off and landing (VTOL) unmanned aerial system (UAS) with an embedded flight control system for UAS flight control, the VTOL UAS, in use, being powered via a coaxial tether by a DC circuit coupled with a RF transmitter to simultaneously power the UAS and radiate a desired pattern of RF energy from the tether, the tether thereby acting as an antenna of said antenna system when the VTOL UAS is, in use, airborne; wherein the coaxial tether comprises a core conductor and an outer sheath conductor; wherein the DC circuit is coupled to the outer sheath conductor and to the core conductor to apply DC energy between the outer sheath conductor and the core conductor and wherein the RF energy from the RF transmitter is applied to the outer sheath conductor.

2. The antenna system according to claim 1 wherein the tether has a length that electrically small when a RF signal generated by the RF transmitter has wavelengths corresponding to LF, VLF, ELF frequencies or is a full-length resonant antenna when the RF signal generated by the RF transmitter has wavelengths corresponding to broadcast (AM or FM) frequencies.

3. The antenna system according to claim 1 wherein the VTOL UAS has at least one metallic ring disposed outboard of motors lifting the VTOL UAS to thereby reduce RF corona when the tether is radiating RF energy.

4. The antenna system according to claim 1 wherein the VTOL UAS has at least one metallic ring disposed adjacent motors lifting the VTOL UAS to thereby reduce RF corona when the tether is radiating RF energy.

5. The antenna system according to claim 1 wherein the tether has an increased outer diameter over a portion of its total length, the increased outer diameter occurring at least in a region adjacent the VTOL UAS.

6. The antenna system according to claim 1 wherein the VTOL UAS has a metallic housing or a metallic coating on a housing for receiving RF energy via the tether.

7. The antenna system according to claim 1 wherein the VTOL UAS includes a portion of a wireless command signal communication system and another portion of the wireless command signal communication system being disposed adjacent the RF transmitter, the wireless command signal communication system operating at frequencies sufficiently different from frequencies transmitted by the RF transmitter to reduce radio interference between the wireless communication system and the RF energy transmitted by the RF transmitter, the wireless command signal communication system carrying signals for controlling airborne flight of the VTOL UAS.

8. The antenna system according to claim 1 wherein the VTOL UAS includes a wired command signal communication system wherein a first portion of the wired command signal communication system is disposed adjacent the RF transmitter and a second portion of the wired command signal communication system is included in the VTOL UAS, the first and second portions of the wired command signal communication system being connected with each other via a metallic wire in the tether for carrying signals for controlling flight of the VTOL UAS.

9. The antenna system according to claim 1 wherein the VTOL UAS includes a portion of a communication system and a portion of the communication system is disposed adjacent the RF transmitter, the portion of the communication system included in the VTOL UAS and the portion of the communication system disposed adjacent the RF transmitter being connected together by an optic fiber or optic cable disposed in the tether, the optic fiber or optic cable carrying signals for controlling flight of the VTOL UAS.

10. The antenna system according to claim 9 wherein the optic fiber or cable is disposed in a gap between an inner core and an outer sheath thereof, the RF energy radiating from the outer sheath of the tether and wherein the inner core and the sheath are used to couple the DC circuit to said VTOL UAS for supplying DC electrical power thereto.

11. The antenna system according to claim 1 wherein the VTOL UAS includes a portion of a communication system and a portion of the communication system is disposed adjacent the RF transmitter, the portion of the communication system included in the VTOL UAS and the portion of the communication system disposed adjacent the RF transmitter being operationally interconnected together by wired-together multiplexing means and de-multiplexing means coupled with the DC circuit.

12. The antenna system according to claim 1 wherein the DC circuit utilizes an isolation transformer and rectifiers for suppling DC power to motors powering the VTOL UAS via the tether while the tether simultaneously carries a RF signal from the RF transmitter, the RF signal being applied to a sheath of the tether while the DC power is applied to both said sheath and a center conductor of the tether, the sheath and the center conductor being spaced from each other by an air or otherwise insulating gap.

13. The antenna system according to claim 12 wherein the coaxial cable is sufficiently sized to handle (i) RF voltages without inducing corona discharge along its length, (ii) RF+DC currents on its sheath and center conductor and/or (iii) tension in the tether developed during flight of the VTOL UAS.

* * * * *